(12) United States Patent
Cottereau et al.

(10) Patent No.: US 11,187,438 B2
(45) Date of Patent: Nov. 30, 2021

(54) PART FOR JOULE-THOMSON COOLER AND METHOD FOR MANUFACTURING SUCH A PART

(71) Applicant: SAFRAN ELECTRONICS & DEFENSE, Boulogne-Billancourt (FR)

(72) Inventors: Bertrand Cottereau, Boulogne-Billancourt (FR); Nicolas Duval, Boulogne-Billancourt (FR); Edwina Bordais, Boulogne-Billancourt (FR); Michel Bidaud, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/256,062

(22) PCT Filed: Jun. 26, 2019

(86) PCT No.: PCT/FR2019/051575
§ 371 (c)(1),
(2) Date: Dec. 24, 2020

(87) PCT Pub. No.: WO2020/002834
PCT Pub. Date: Jan. 2, 2020

(65) Prior Publication Data
US 2021/0148609 A1    May 20, 2021

(30) Foreign Application Priority Data

Jun. 26, 2018 (FR) ...................... 1855707

(51) Int. Cl.
*F25B 9/02* (2006.01)
*B29C 64/153* (2017.01)
*B33Y 10/00* (2015.01)

(52) U.S. Cl.
CPC .............. *F25B 9/02* (2013.01); *B29C 64/153* (2017.08); *B33Y 10/00* (2014.12); *F25B 2309/022* (2013.01); *F25B 2500/04* (2013.01)

(58) Field of Classification Search
CPC .......... F25B 9/02; B29C 64/153; B33Y 10/00
See application file for complete search history.

(56) References Cited

U.S. PATENT DOCUMENTS

| 3,188,824 A | 6/1965 | Geist et al. |
| 2015/0040991 A1* | 2/2015 | Cohen .................. F16K 17/048 137/12.5 |
| 2017/0008086 A1* | 1/2017 | Jones ...................... B22F 5/009 |

FOREIGN PATENT DOCUMENTS

| EP | 3 034 917 A1 | 6/2016 |
| FR | 2 883 365 A1 | 9/2008 |
| FR | 18 55707 B1 | 5/2020 |

OTHER PUBLICATIONS

International Search Report and Written Opinion of the International Searching Authority for International Application No. PCT/FR2019/051575, dated Nov. 6, 2019.

* cited by examiner

*Primary Examiner* — Moshe Wilensky
(74) *Attorney, Agent, or Firm* — Birch, Stewart, Kolasch & Birch, LLP

(57) ABSTRACT

A part for a Joule-Thomson cooler, comprising a gas discharge pipe and a seal closing the gas discharge pipe, the seal being capable of breaking, at least partially, under the effect of gas expansion triggered by the cooler so as to allow the gas to be discharged out of the cooler through the gas discharge pipe. The part is obtained by an additive manufacturing method that comprises stacking layers of powder along a stacking axis in order to form the part, the stacking (Continued)

axis being parallel to a central axis of a second gas discharge pipe separate from the first discharge pipe.

14 Claims, 7 Drawing Sheets

PART FOR JOULE-THOMSON COOLER AND METHOD FOR MANUFACTURING SUCH A PART

FIELD OF THE INVENTION

The present invention concerns a Joule-Thomson cooler and a method for manufacturing such a cooler.

STATE OF THE ART

In a known manner, a Joule-Thomson cooler is a device producing cold by expanding a high-pressure gas.

This type of cooler is for example found in infrared detection devices, with the aim of cooling an infrared detector of such devices. The expanded gas passes in the vicinity of the infrared detector and is then discharged outside the cooler via a ga3s discharge duct.

It is known to arrange a seal in the gas discharge duct in order to close it. The seal thus prevents polluted gas coming from the exterior of the cooler from being introduced into the cooler, which would impair its good operation.

The seal is adapted to break under the effect of the gas expansion triggered by the cooler. Once the seal is broken, the expanded gas can be discharged out of the cooler.

The seal, which constitutes an independent part, is welded to a metal part in which the gas discharge duct is formed.

However, the closure element formed after assembly of these two parts has the drawback of being heavy. However, in some applications, it is absolutely critical to lighten the cooler as much as possible.

Moreover, such a weld is relatively complex to perform. Indeed, it is essential that this weld is sealed.

Finally, the use of metal involves an additional cost of manufacturing the cooler.

DISCLOSURE OF THE INVENTION

An aim of the invention is to propose a Joule-Thomson cooler which is easier and less expensive to manufacture.

There is therefore proposed, according to a first aspect, a part for a Joule-Thomson cooler, which is obtained by an additive manufacturing method, the part comprising a gas discharge duct and a seal closing the gas discharge duct, the seal being adapted to break at least partially under the effect of gas expansion triggered by the cooler so as to allow a discharge of the gas out of the cooler through the gas discharge duct.

The part comprises a second gas discharge duct separate from the gas discharge duct closed by the seal.

The method for manufacturing the part comprises a stack of powder layers along a stacking axis to form the part, the stacking axis being parallel to a central axis of the second gas discharge duct.

Forming the part by stacking the powder layers along this particular stacking axis has the advantage of minimizing the shape imperfections in the part at the second duct. Such imperfections would be likely to impair the sealing of the second duct when the latter is closed using a closure element.

The part according to the first aspect can further comprise the following characteristics, taken alone or combined together when this is technically feasible:

The seal is preferably not parallel to the powder layers that have been stacked to form the part, during the method for additive manufacture of the part.

The seal preferably comprises:
a first portion for connection to the gas discharge duct, the first connection portion being adapted to break under the effect of the gas expansion,
a second portion for connection to the gas discharge duct, the second connection portion being adapted to remain connected to the gas discharge duct despite the gas expansion, the second connection portion forming a hinge around which the seal is likely to pivot relative to the gas discharge duct once the first connection portion is broken.

The part preferably comprises a grid arranged in the gas discharge duct downstream of the seal to retain the seal in the gas discharge duct when the seal is broken under the effect of the gas expansion, the grid having at least one outlet orifice opening out into the gas discharge duct and outside the cooler.

The part preferably comprises a first surface delimiting the gas discharge duct between the seal and the grid, and a second surface partially delimiting the outlet orifice, the second surface continuously extending the first surface.

The part is preferably made of plastic material.

Preferably, the part is a one-piece element. This helps to reduce the number of parts of the cooler, and therefore further simplifies its manufacture.

There is also proposed, according to a second aspect, an assembly for a Joule-Thomson cooler comprising a part according to the first aspect of the invention, and a closure element movable between an open position allowing a discharge of the gas through the second gas discharge duct while the seal is not broken and a closed position preventing gas from being discharged through the second gas discharge duct.

The closure element preferably comprises a screw cooperating with a thread formed in the second gas discharge duct.

This assembly may also comprise retaining means for retaining the closure element in the second gas discharge duct.

There is proposed, according to a third aspect, a Joule-Thomson cooler comprising the part according to the first aspect or the assembly according to the second aspect.

There is proposed, according to a fourth aspect, an infrared detection device comprising an infrared detector, and a cooler according to the third aspect of the invention for cooling the infrared detector.

There is proposed, according to a fifth aspect, a manufacturing method for obtaining the part according to the first aspect.

There is also proposed, according to a sixth aspect, a method for manufacturing a Joule-Thomson cooler according to the fourth aspect.

DESCRIPTION OF THE FIGURES

Other characteristics, aims and advantages of the invention will emerge from the following description, which is purely illustrative and not restrictive, and which should be read in relation to the appended drawings wherein.

In all of the figures, similar elements bear identical references.

DETAILED DESCRIPTION OF THE INVENTION

Figure 1:
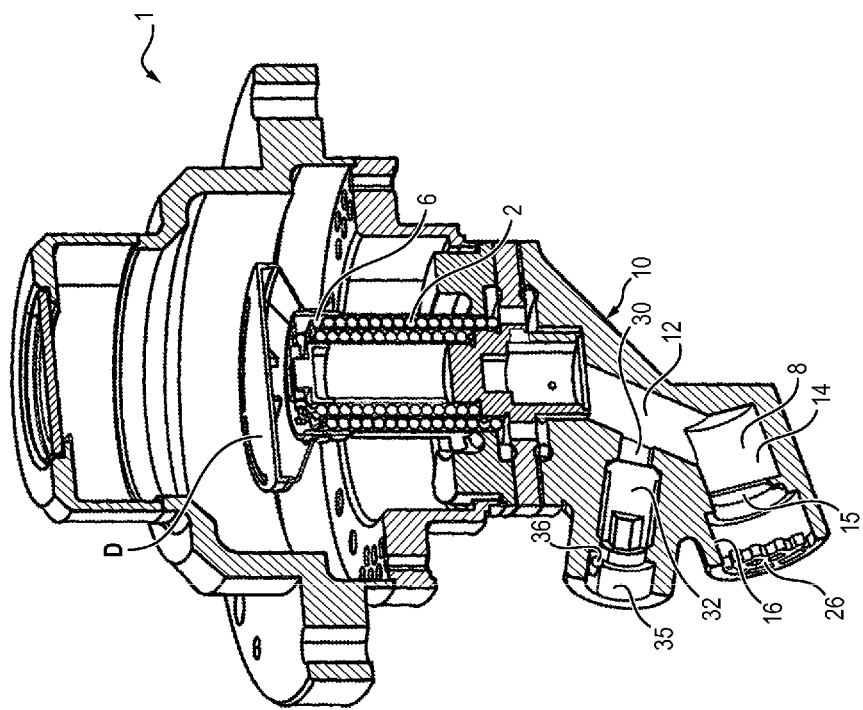
FIG. 1 is a sectional view of an infrared detection device comprising a cooler according to one embodiment.

Referring to FIG. 1, an infrared detection device comprises an infrared detector D and a cooler 1 for cooling the infrared detector D.

The infrared detection device is for example a seeker head for a missile.

The cooler 1 is a Joule-Thomson type cooler using gas to cool the infrared detector.

In a manner known per se, the cooler 1 comprises a gas intake duct 2 comprising a gas intake orifice 4 (visible in FIG. 2) and terminating in an expansion orifice (or nozzle) arranged in the vicinity of the detector D.

The intake orifice is itself connected to a gas reservoir (not represented in the figures) via a pipe or tube 6. The gas reservoir is typically a gas cylinder compressed to several hundred bars, for example 700 bars.

The gas intake duct 2 comprises in particular a helical portion, so as to have a large length in a relatively small volume.

Figure 2B:
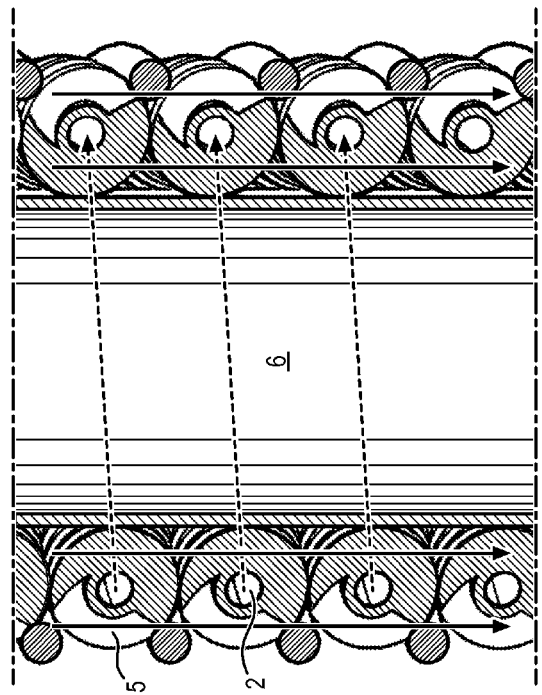
FIGS. 2a and 2b are respectively a perspective view and a sectional view detailing some gas ducts of the cooler already represented in FIG. 1.
Figure 2A:
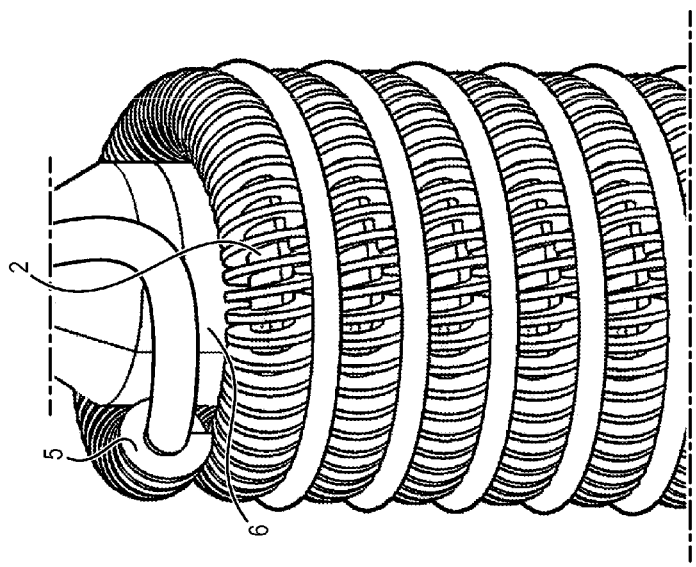

Referring to FIGS. 2a and 2b, this helical portion comprises a tube wound around a cylindrical support, and a plurality of fins 5 protruding radially around the tube. Gas circulating in this tube follows a helical path towards the expansion orifice (this path is indicated by dashed arrows in FIG. 2b pointing upwards).

The cooler 1 also comprises a second duct 6 into which the expansion orifice also opens out.

The second duct 6 is arranged to receive gas coming from the expansion orifice, during the operation of the cooler 1.

The second duct 6 is formed in an annular space in which the helical portion of the gas intake duct 2 is wound. In this annular space, the helical portion occupies a certain volume, but gas can circulate between the fins 5, according to a substantially rectilinear path (indicated by several parallel arrows pointing downwards in FIG. 2b).

The gas intake duct 2 and the second duct 6 are in heat exchange with each other since the gas circulating in the second duct 6 comes into contact with the fins 5 of the tube that forms the helical portion of the intake duct 2.

Figure 3:
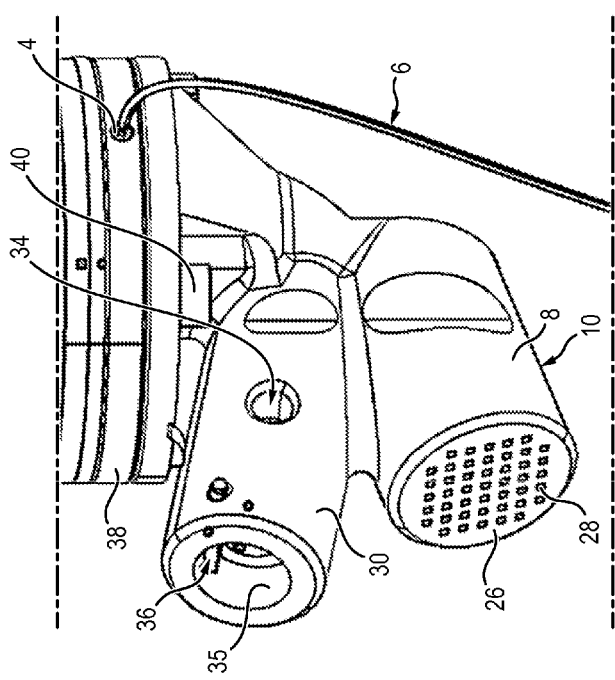
FIG. 3 is a side view of a discharge part of the cooler already represented in FIG. 1.

Referring to FIG. 3, the cooler 1 further comprises a gas discharge duct 8.

The gas discharge duct 8 is arranged to receive gas coming from the second circuit 6, during the operation of the cooler 1. It has the function of discharging the gas it receives outside the cooler 1.

The gas discharge duct 8 is formed in a part 10 of the cooler 1 which is obtained by an additive manufacturing method.

Preferably, the part is a one-piece element.

The part 10 is made of plastic material. Such a material has the advantage of being much lighter than metal.

The part comprises, for example, nylon. This material has the advantage of being particularly adapted to cryogenic applications.

The gas discharge duct 8 is bent. In other words, it comprises a first duct portion 12 having a first gas flow axis, and a second duct portion 14 downstream of the first duct portion 12, the second duct portion 14 having a second gas flow axis different from the first gas flow axis. However, the gas discharge duct 8 may be straight in another embodiment.

The second duct portion 14 is defined by a surface 16 closed on itself about the second gas flow axis. This surface 16 typically has a shape of revolution, although this is not strictly necessary.

The gas discharge duct 8 terminates in a gas outlet 18 opening out outside the cooler.

The part 10 comprises a seal 15 arranged in the gas discharge duct 8, in order to close the gas discharge duct 8.

The seal 15 is arranged upstream of the gas outlet 18. A gas coming from the duct 6 is thus prevented from reaching the gas outlet through the seal 15. Likewise, a gas entering the cooler through the gas outlet 18 is prevented from reaching the duct 6 and the detector D because of the seal 18, which would pollute the interior of the cooler 1.

Furthermore, the seal 15 is arranged in the second portion of the gas discharge duct 8.

The seal 15 has the overall shape of a disc.

The seal extends perpendicularly to the second gas flow axis.

Figure 4:
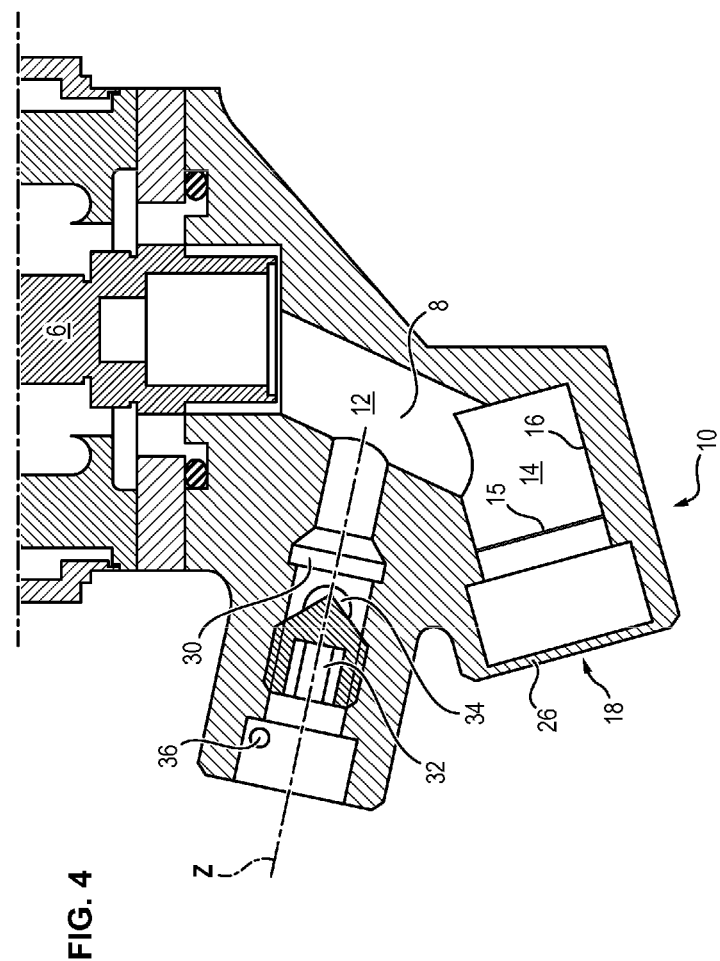
FIG. 4 is a longitudinal sectional view of the discharge part of the cooler already represented in FIG. 3.
Figure 5:
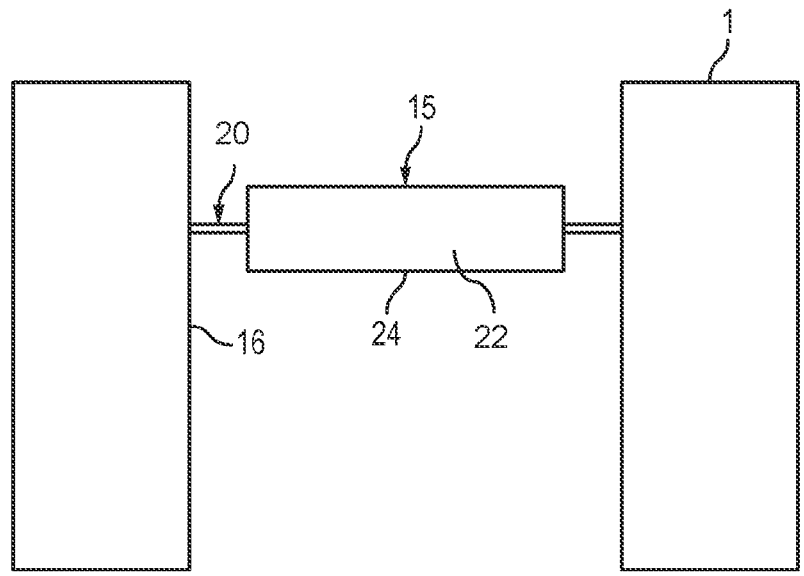
FIG. 5 is a schematic sectional view of a discharge duct portion defined by the discharge part of FIG. 3.

Referring to FIGS. 4 and 5, the seal 15 is connected to the duct through a first connection portion 20 and a second connection portion 22 (these portions forming a circumference of the disc).

The first connection portion 20 is a weakened portion, adapted to break under the effect of a gas expansion triggered by the cooler 1.

The second portion for connection 22 to the duct is a comparatively stronger portion than the first connection portion 20. It is adapted to remain connected to the duct despite the triggering of the same gas expansion triggered by the cooler 1.

The second connection portion 22 forms a hinge. The seal 15 is likely to pivot around the second connection portion 22 forming a hinge relative to the gas discharge duct 8 once the first connection portion 20 is broken, so as to allow a discharge of the gas through the gas discharge duct.

The second connection portion 22 forming a hinge extending over an angular sector of less than 10 degrees around the second gas flow axis.

Typically, the second portion has a greater thickness than the first portion.

As shown in FIG. 5, the second portion is typically in the form of an element protruding from the downstream face of the seal 15 and from the surface 16 delimiting the gas discharge duct 8.

Figure 6:
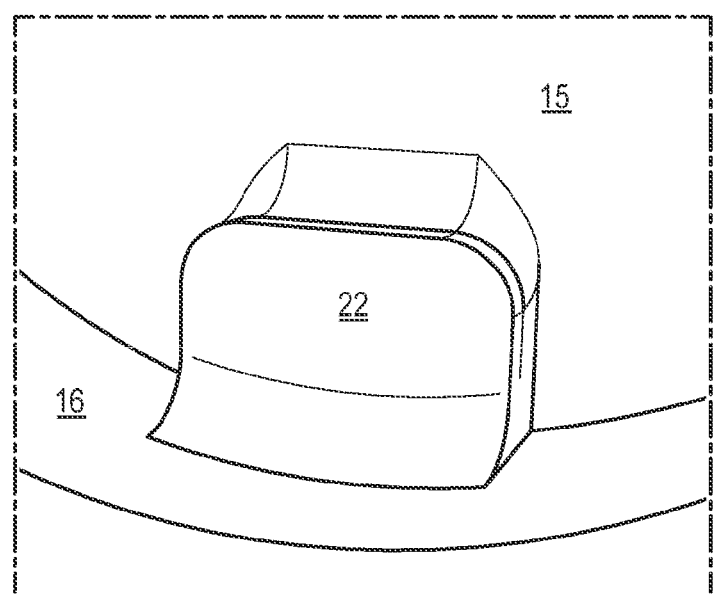
FIG. 6 also details a portion of a seal present in the part represented in FIGS. 3 to 5.

Referring to FIG. 6, the part 10 further comprises a grid 26 located downstream of the seal 15, at a distance therefrom. The grid 26 is facing the downstream face of the seal 15.

The grid 26 is arranged at the outlet of the gas discharge duct 8.

The grid 26 defines a plurality of outlet orifices 28; the grid 26 prevents the seal 15 from being discharged out of the cooler 1.

The distance between the grid 26 and the seal 15 is preferably greater than the diameter of the seal 15. In this way, the seal 15 has enough room to pivot up to 90 degrees in the gas discharge duct 8 around its connection portion 22 forming the hinge, without touching the grid 26 during its pivoting around the second connection portion 22 forming the hinge. This allows preventing the seal 15 from obstructing orifices of the grid 26 and preventing this grid 26 from limiting the pivoting angle of the seal 15.

At least one portion of the surface delimiting one of the orifices 28 of the grid 26 continuously extends the surface 16 of the second duct 6. By "continuous extension" is meant an extension devoid of any asperity. Such an arrangement facilitates the exit of excess powder grains from the interior of the second duct 6 to the exterior of the cooler 1 (it will be seen below that such a powder serves as a starting material for manufacturing the part 10 in which the gas discharge duct 8 and the grid 26 are formed).

Figure 7:
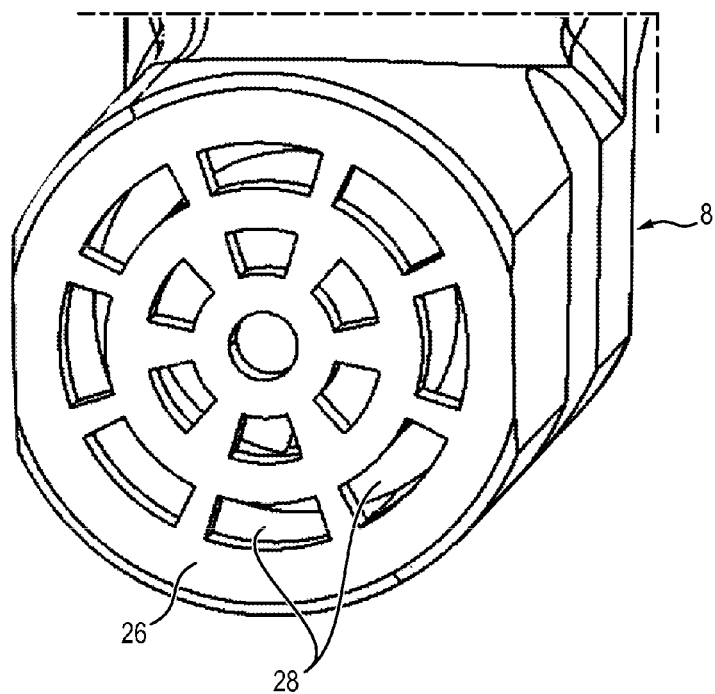
FIG. 7 is a front view of a portion of the discharge part of FIG. 3.

Referring to FIG. 7, the part 10 also comprises another gas discharge duct 30, which will be called test duct 30 in the following.

The test duct 30 is arranged to receive gas coming from the second duct 6, during the operation of the cooler 1.

The test duct 30 opens out into the first portion 12 of the gas discharge duct 8.

The test duct 30 is of revolution about a central axis of this test duct.

The central axis of this test duct 30 is not parallel to the second gas flow axis. In other words, the second portion of the gas discharge duct 8 and the test duct 30 are not parallel.

The cooler 1 comprises a closure element 32 of the second duct 6. The closure element 32 is movable between an open position allowing a discharge of the gas through the second gas discharge duct 6, and a closed position preventing the gas from being discharged through the second 32 gas discharge duct 6.

The closure element 32 is independent of the part 10.

The closure element 32 is for example a screw. The test duct 30 has in this case a thread adapted to cooperate with the screw 32. The screwing axis of the screw is the central axis Z of the test duct 30.

The test duct has in particular a segment defining a conical surface. An end portion of the screw, also conical in shape, is pressed against the conical surface of this segment in the closed position of the screw.

The part 10 has a test orifice 34 opening out into test duct 30 and outside the part 10.

When the closure element 32 is placed in its closed position, this closure element 32 blocks this test orifice 34. When the closure element 32 is in its open position, the closure element 32 no longer completely blocks this test orifice 34, which allows gas contained in the test duct to exit out of the cooler 1 through the test orifice 34.

The part 10 has another orifice 35 opening out into the test duct 30 and outside the part 10. It is through this orifice 35 that the closure element 32 can be introduced inside the test duct 30.

It is also through this orifice 35 that an instrument such as a screwdriver can be introduced to screw/unscrew the screw, so as to move it into its open position or its closed position.

The cooler 1 further comprises means for retaining 36 the closure element in the second gas discharge duct 6.

These retaining means 36 comprise, for example, a pin engaged in a passage transverse to the test duct 30, this transverse passage being located between the orifice 35 and the closure element 32 engaged in the test duct 30.

The retaining means 36 are arranged so as to allow the instrument introduced through the orifice 35 to engage with the closure element 32, so as to move this closure element in its closed position and in its open position.

When the retaining means 36 form a pin extending in a transverse passage, it is ensured that this passage is offset with respect to the central axis of the test duct (this central axis Z typically corresponding to the screwing/unscrewing axis of the screw).

The part 10 further comprises an attachment portion 38 for attaching the part 10 to the rest of the cooler 1. When the attachment portion 38 is attached to the rest of the cooler, the duct 6 and the gas discharge duct 8 are put in fluid communication.

The attachment portion 38 typically comprises a collar having a plurality of attachment orifices, in which attachment elements 40 can be engaged for the attachment portion 38 to be fixed to the rest of the cooler.

As indicated above, the part 10 is obtained by an additive manufacturing method.

In known manner, such a method uses a powder as a starting material. The powder is made of plastic material.

Several powder layers are stacked on each other along a stacking direction Z. The layers extend in respective planes (X, Y) perpendicular to the direction Z. For each powder layer, a laser locally heats some areas of the layer so as to make sure that the grains in these areas are fixed to each other. It is these grains fixed to each other that form the part 10.

Preferably, a direction parallel to the central axis Z of the test duct 30 is chosen as the stacking direction.

Forming the part 10 by stacking the powder layers along this particular stacking axis Z has the advantage of minimizing the shape imperfections in the part 10 at the test duct 30. Such imperfections would be likely to impair the sealing of the test duct 30 when the closure element is in its closed position.

The part 10 has typically striations indicative of the orientation of the powder layers that have been stacked during the method for additive manufacture of this part 10. By examining these striations, if necessary using a microscope, it is possible to deduce therefrom the layer stacking axis Z that has been chosen. In the case where if this stacking axis Z is parallel to the central axis of the test duct 30, the test duct 30 has striations extending about the central axis of the duct, perpendicular to the central axis of the duct (if the duct is of revolution, these striations are then circular). Otherwise, the striations are not perpendicular to the central axis of the test duct.

Furthermore, it is preferably insured that the seal 15 is not parallel to the planes of the powder layers. This allows facilitating a breaking of the seal 15. In this case, this condition is satisfied when the central axis of the test duct 30 is parallel to the layer stacking axis and when the ducts 8, 30 are not parallel.

Once the part 10 is formed, excess grains may be found in the gas discharge duct 8 between the grid 26 and the seal 15. These excess grains are discharged out of the part 10 by orienting the gas discharge duct 8 downwards. The particular disposition of some of the outlet orifices 28 formed in the grid 26 facilitates the discharge of these excess grains.

There are two operating modes for the cooler 1: a test mode and a normal operating mode.

Figure 8:
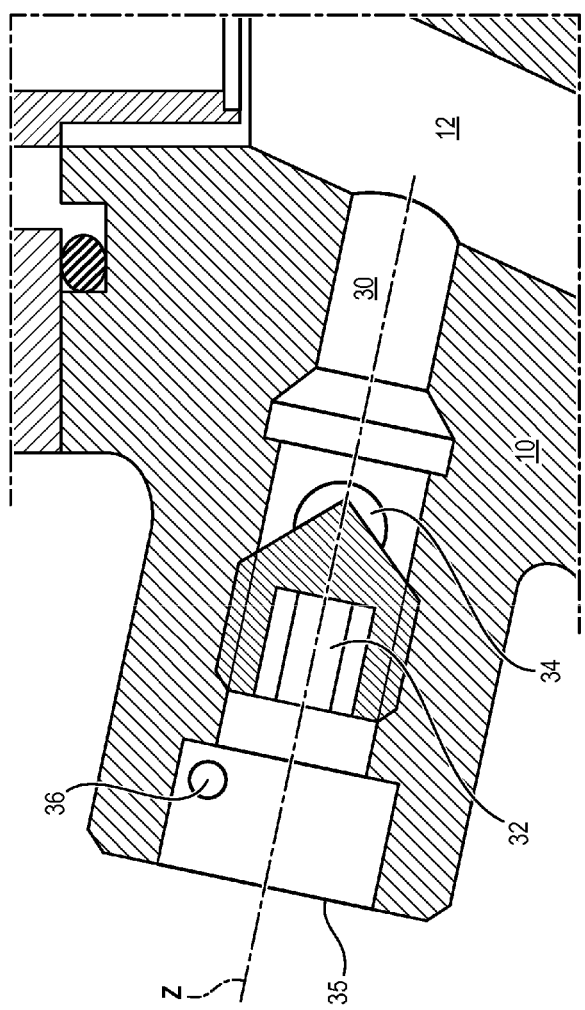
FIG. 8 is a partial longitudinal sectional view of the discharge part of the cooler already represented in FIG. 3.

In the test mode, the closure element 32 is placed in the open position, as represented in FIG. 8.

Then cooler 1 is started.

Conventionally, a high-pressure gas enters the first duct 2 via the intake orifice 4, circulates in the helical finned portion 5 according to the helical path indicated in FIG. 2b, undergoes an expansion at the expansion orifice, which has the effect of cooling this gas at the detector D. The detector D is therefore itself cooled by the expanded gas. The cooled and expanded gas then circulates in the second duct 6, passes between the fins 5 of the tube forming the helical portion of the intake duct 2. It should be noted that the gas circulating in the second duct 6 also contributes to cooling the gas circulating in the gas intake duct 2 towards the expansion orifice, since a heat exchange occurs between the ducts 2 and 6 via the fins 5.

The cooled gas then enters the gas discharge duct 8 formed in the part 10.

As the closure element 32 is placed in the open position, the cooled gas can be discharged out of the cooler 1 through the test orifice 34. This test mode allows verifying the correct operation of the cooler 1 using gas, without breaking the seal 15.

In the normal operating mode, the closure element 32 is placed in the closed position.

Then, the cooler 1 is started. The gas follows the same path as the one described for the test mode upstream of the gas discharge duct 8.

The cooled gas then enters the gas discharge duct 8.

As the closure element 32 is placed in the closed position, the cooled gas cannot be discharged out of the cooler 1 via the test orifice 34. The cooled gas therefore breaks the seal 15 at its first connection portion 20. After this breaking, the seal 15 pivots around its second connection portion 22 relative to the discharge duct 8, so as to allow the gas to pass further downstream in the duct 8 towards the grid 26. The gas is then discharged out of the cooler 1 via the orifices formed in the grid 26.

It should be noted that the seal 15, once broken, can no longer be repositioned in its initial position in which it closes the discharge duct 8.

It is therefore necessary to replace, in the cooler 1, the part 10 whose seal has been broken by another part 10 whose seal has not yet been broken.

The invention claimed is:

1. A part for a Joule-Thomson cooler, the part comprising:
    a first gas discharge duct,
    a seal closing the first gas discharge duct, the seal being adapted to break at least partially under the effect of gas expansion triggered by the cooler so as to allow a discharge of the gas out of the cooler through the first gas discharge duct, and
    a second gas discharge duct separate from the first gas discharge duct,
    a grid arranged in the gas discharge duct downstream of the seal to retain the seal in the gas discharge duct when the seal is broken under the effect of the gas expansion, the grid having at least one outlet orifice opening out into the gas discharge duct and outside the cooler.

2. The part of claim 1, the part being obtained by an additive manufacturing method comprising a stack of powder layers along a stacking axis to form the part, the stacking axis being parallel to a central axis of the second gas discharge duct, wherein the seal is not parallel to the layers.

3. The part of claim 1, wherein the seal comprises:
    a first portion connecting the seal to the gas discharge duct, the first connection portion being adapted to break under the effect of the gas expansion, and
    a second portion connecting the seal to the gas discharge duct, the second connection portion being adapted to remain connected to the gas discharge duct despite the gas expansion, the second connection portion forming a hinge around which the seal is able to pivot relative to the gas discharge duct once the first connection portion is broken.

4. The part of claim 1, wherein the part comprises a first surface delimiting the gas discharge duct between the seal and the grid, and a second surface partially delimiting the outlet orifice, the second surface continuously extending the first surface.

5. The part of claim 1, wherein the part is made of plastic material.

6. The part of claim 1, wherein the part is a one-piece element.

7. An assembly for a Joule-Thomson cooler comprising:
    a part according to claim 1, and
    a closure element movable between an open position allowing a discharge of the gas through the second gas discharge duct while the seal is not broken and a closed position preventing gas from being discharged through the second gas discharge duct.

8. The Joule-Thomson cooler assembly according to claim 7, wherein the closure element comprises a screw cooperating with a thread formed in the second gas discharge duct.

9. The Joule-Thomson cooler assembly according to claim 7, further comprising retaining means for retaining the closure element in the second gas discharge duct.

10. A Joule-Thomson cooler comprising a part according to claim 1.

11. An infrared detection device comprising an infrared detector, and a Joule-Thomson cooler according to claim 10 for cooling the infrared detector.

12. A method for manufacturing a part for a Joule-Thomson expansion cooler configured to cool an object using gas, the part comprising:
    a first gas discharge duct,
    a seal closing the first gas discharge duct, the seal being adapted to break at least partially under the effect of gas expansion triggered by the cooler so as to allow a discharge of the gas out of the cooler through the gas discharge duct, and
    a grid arranged in the gas discharge duct downstream of the seal to retain the seal in the gas discharge duct when the seal is broken under the effect of the gas expansion, the grid having at least one outlet orifice opening out into the gas discharge duct and outside the cooler,
    a second gas discharge duct separate from the first gas discharge duct,
    the method comprising carrying out an additive manufacturing method to obtain the part, the additive manufacturing method comprising stacking powder layers along a stacking axis to form the part, the stacking axis being parallel to a central axis of the second gas discharge duct.

13. The method according to claim 12, wherein the seal is not parallel to the layers.

14. A method for manufacturing a Joule-Thompson cooler, comprising the method according to claim 12.

* * * * *